United States Patent Office 3,406,611
Patented Oct. 22, 1968

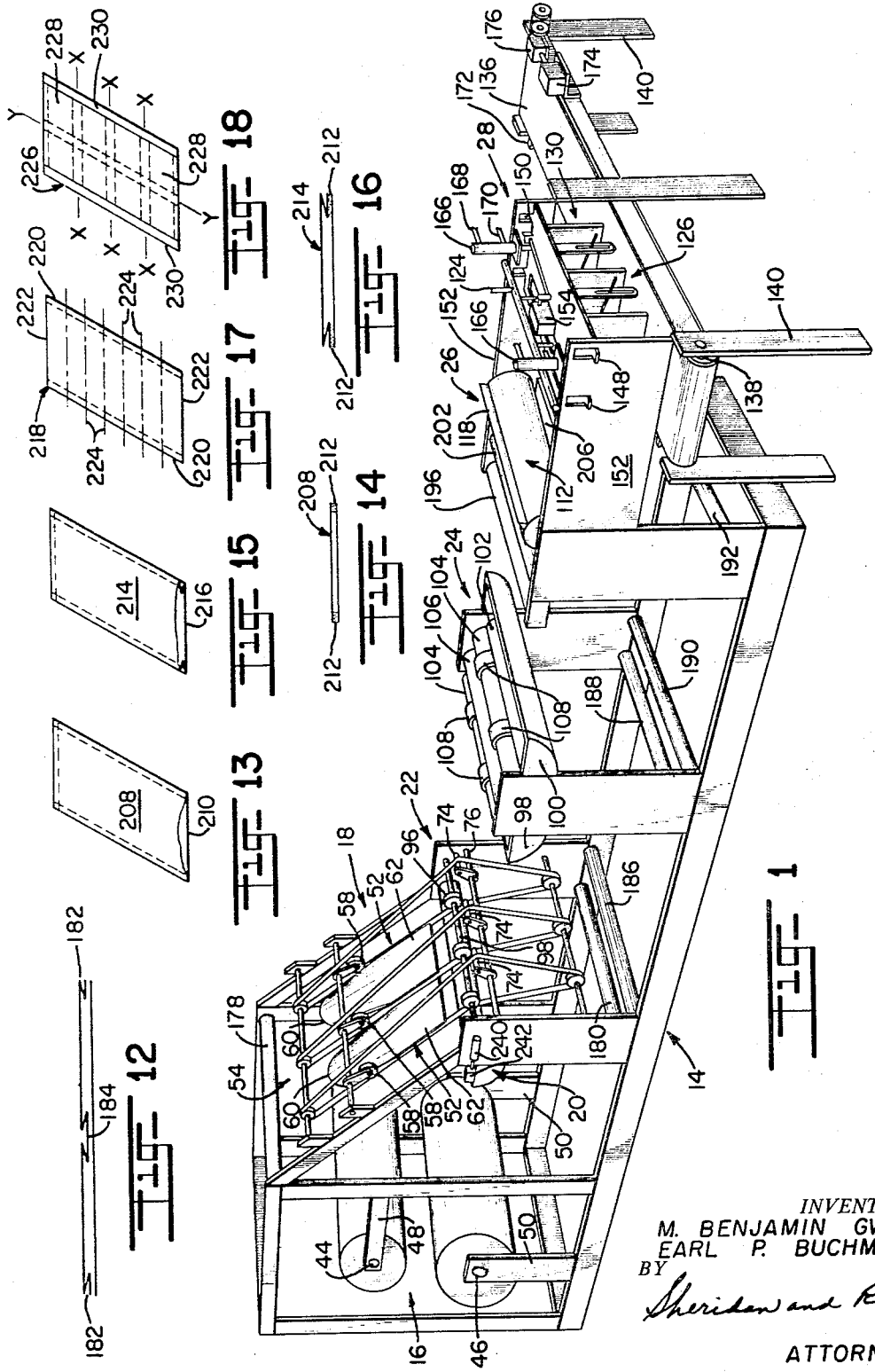

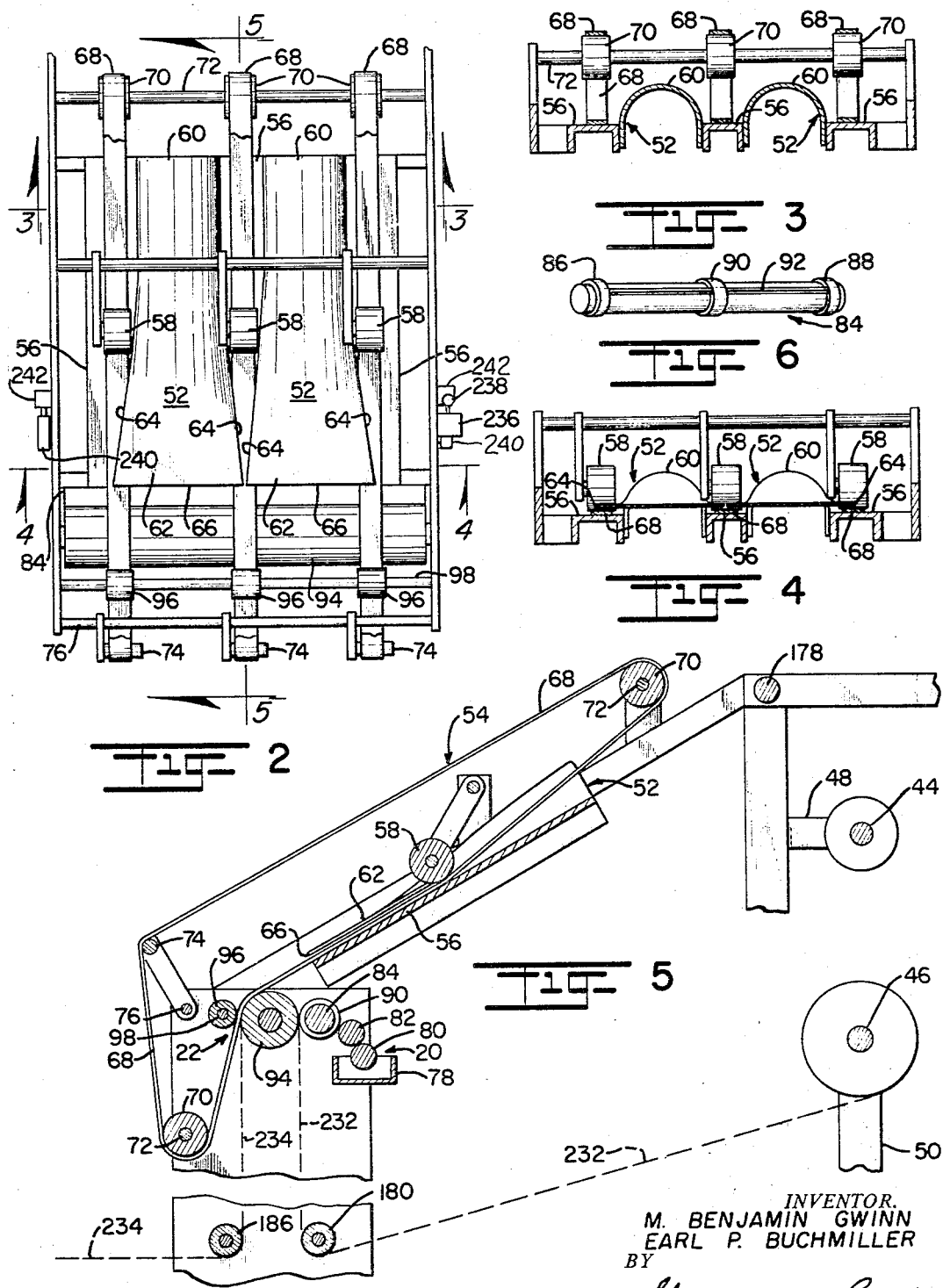

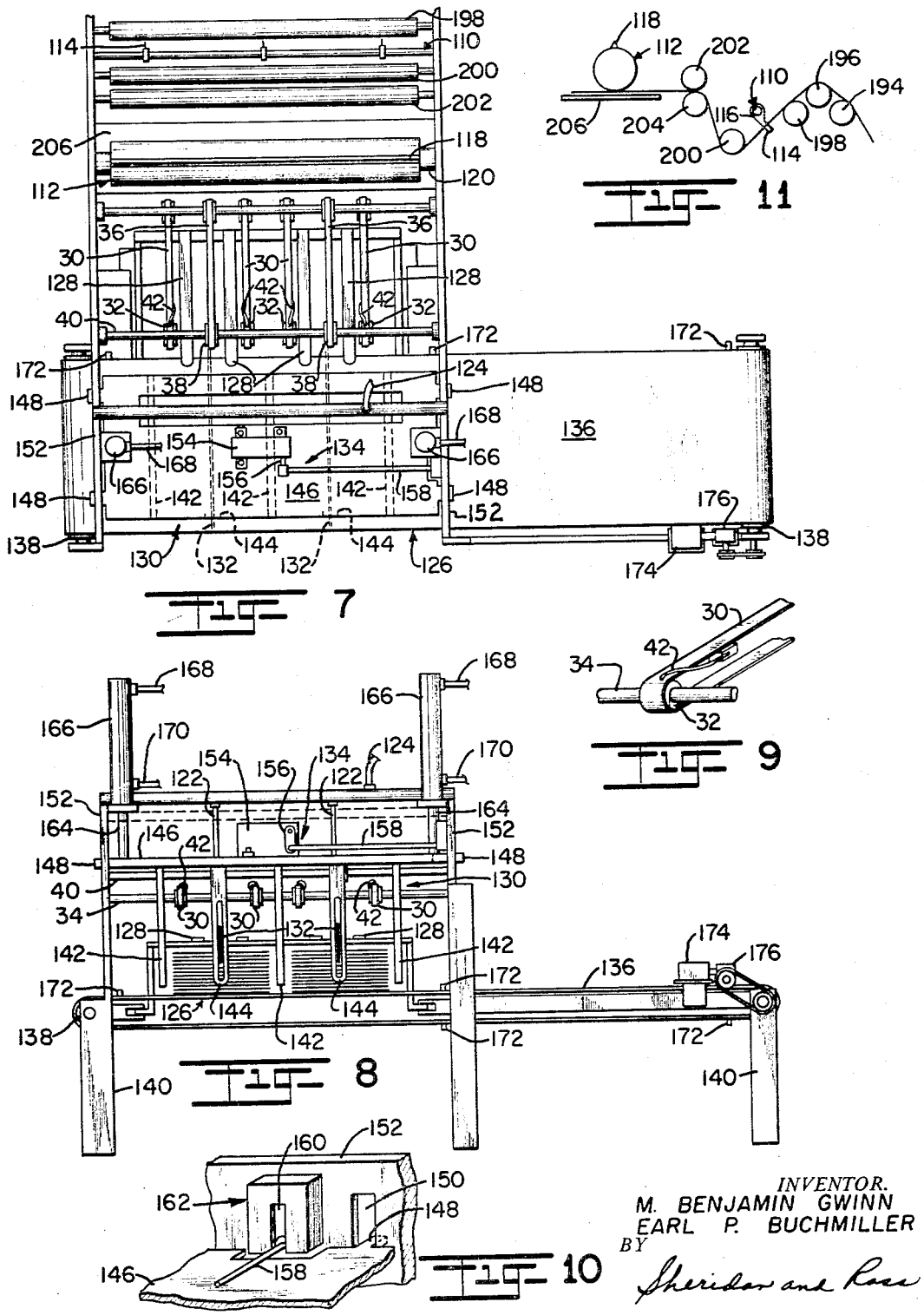

3,406,611
APPARATUS FOR PRODUCING AND STACKING
SHEETLIKE ITEMS
M. Benjamin Gwinn and Earl P. Buchmiller, Denver,
Colo., assignors to National Packaging Products, Denver, Colo., a corporation of Colorado
Filed Oct. 13, 1965, Ser. No. 495,566
13 Claims. (Cl. 93—8)

ABSTRACT OF THE DISCLOSURE

An apparatus for forming from a pair of flexible sheets circumferentially expandable encompassing means, containers and the like and for rapidly processing and continuously stacking flexible sheetlike items. The apparatus for forming a pair of sheets formed from flexible materials circumferentially expandable encompassing means includes means for simultaneously supplying a pair of flexible sheets of dissimilar widths, means for forming longitudinally extending pleats along opposite sides of the wider of six sheets and at least one longitudinally extending inverted plate disposed intermediate said longitudinally extending plates, means for adhering together said sheets along the pleated portions formed along the opposite edges of said wider sheet. The apparatus for rapidly processing and stacking flexible sheetlike items comprises a stacking means, means for transporting flexible sheetlike items to said stacking means, means for increasing the longitudinal rigidity of each sheetlike item by curving opposite edges thereof prior to the delivery thereof to said stacking means, means for imparting a downward force on the rearward portion of each sheetlike item immediately following the exiting thereof from said transport means, said stacking means including a first and second stack support means, said second stack support means being mounted for reciprocal movement in a plane disposed a predetermined distance above said first stack support means, said second stack support means being adapted to receive items from said transport means upon being disposed above said first stack support means.

---

This invention relates generally to an apparatus for producing, processing and stacking sheetlike items and more particularly to an apparatus for rapidly processing and continuously stacking flexible sheetlike items, and for forming from a pair of flexible sheets circumferentially expandable encompassing means, containers and the like.

Heretofore, prior art apparatuses for forming circumferentially expandable encompassing means and gussetted containers and the like utilized in essence a single sheet of material in forming such means or containers. Of necessity, such prior art apparatuses were complex in operation, somewhat cumbersome, operated at relatively slow speeds and were expensive to manufacture. In addition, prior art devices which were used to form, process and stack flexible sheetlike items were limited in speed of operation. For example, when the item was ejected from the feed or processing means to a vertically disposed stack, the processing rate had to be limited in order to prevent the leading portion of a following item from interference contact with the trailing portion of the previously ejected item and thereby eliminate or prevent a disruption in the stacking and feeding operation of the apparatus. Such interference contact occurred as a result of the flexibility of the material used to form the item and "lift" resulting from the velocity of air passing over the upper surface thereof upon ejection of same from the feed processing means. These two features combined to cause the forward end or leading portion of the item to drop rather sharply onto the stack while the trailing end tended to "float" or remain suspended slightly above the end of the surface from which same was ejected from the feeding or processing means. Also, the processing rate of finished items was further adversely affected due to the inability to form continuously stacks containing a predetermined quantity of items. For example, although there was no difficulty in counting the number of items fed onto the stack, the difficulty arose in removing the finished stacks at exactly the right time and without interfering with the operation of the machine. Invariably, due to the inability to control accurately this problem of removing a stack at exactly the right time, each stack contained more or less items than desired.

It has been found, however, that each of the problems encountered with the prior art devices can be overcome through the use of an improved, greatly simplified and relatively inexpensive apparatus incorporating unique means for forming at greatly increased rates circumferentially expandable encompassing means, containers and the like from a pair of flexible sheets, means for handling flexible, sheetlike items in a manner to overcome the problems arising from the flexibility of the material used to form such items, means for eliminating the tendency of a flexible, sheetlike item to "float" above the surface of the feeding or processing means after same has been ejected therefrom, and means for enabling continuous stacking of containers while maintaining a precise and accurate count of the number of items in each stack without interferring with or interrupting the operation of the apparatus.

Accordingly, one of the principal objects of this invention is to provide an improved, greatly simplified in design, inexpensive to manufacture apparatus for producing and handling flexible, sheetlike items.

Another object of this invention is to provide an apparatus for producing from a pair of sheets formed from flexible material circumferentially expandable encompassing means and containers.

Another object of this invention is to provide an apparatus for producing presealed bands.

Another object of this invention is to provide an apparatus for producing from a pair of sheets or from contrasting flexible materials gussetted encompassing means and containers.

Another object of this invention is to provide an apparatus for rapidly processing and continuously forming stacks of flexible, sheetlike items.

Another object of this invention is to provide an apparatus for rapidly processing flexible, sheetlike items, said apparatus incorporating means for increasing the longitudinal rigidity of each sheetlike item by curving two opposed edge portions thereof.

Another object of this invention is to provide an apparatus for continuously forming verticaly disposed stacks each containing a predetermined quantity of items, said apparatus including a pair of support means one of which is mounted for reciprocal movement in a plane disposed at a predetermined distance above the other said support means.

Another object of this invention is to provide an apparatus for continuously forming a plurality of vertically disposed stacks each which contain a predetermined quantity of items.

Another object of this invention is to provide an apparatus for producing from contrasting materials encompassing means and containers for enhanced appearance.

Additional objects and novel features of this invention will become apparent from the description which follows, taken in conjunction with the accompanying drawings in which:

FIGURE 1 is a perspective view of an apparatus constructed in accordance with this invention, some parts removed;

FIGURE 2 is a plan view of a means for forming longitudinally extending pleats within one of a pair of flexible sheets;

FIGURE 3 is an elevational, cross-sectional view taken along line 3—3 of FIGURE 2;

FIGURE 4 is an elevational, cross-sectional view taken along line 4—4 of FIGURE 2;

FIGURE 5 is a side elevational view in partial cross-section taken along line 5—5 of FIGURE 2;

FIGURE 6 is a perspective view of another means for applying an adhesive material to one of the sheets being processed through the apparatus;

FIGURE 7 is a top plan view showing a portion of the means for rapidly processing flexible, sheet-like items and means for continuously forming stacks of flexible sheet-like items;

FIGURE 8 is a front elevational view of the apparatus shown in FIGURE 7;

FIGURE 9 is a perspective view taken along line 8—8 of a portion of the means for increasing the longitudinal rigidity of a flexible, sheet-like item as same is processed through the apparatus of this invention;

FIGURE 10 is a perspective view showing one way of mounting of rod 158 with the end member 146;

FIGURE 11 is a schematic depiction of the severing means;

FIGURE 12 is a cross-sectional view of the two flexible sheets upstream of the means for bringing the two sheets into contacting engagement with the upper portion thereof shown in a slightly expanded condition for purposes of clarity;

FIGURE 13 is a perspective view of a flexible container produced by the apparatus of this invention;

FIGURE 14 is a schematic cross-sectional depiction of the container shown in FIGURE 13;

FIGURE 15 is a perspective view of a circumferentially expandable container produced by an apparatus of this invention;

FIGURE 16 is a schematic cross-sectional depiction of the container shown in FIGURE 15;

FIGURE 17 is a perspective view of an item produced by an apparatus of this invention from which a plurality of presealed bands may be formed; and FIGURE 18 is a perspective view of another item produced by an apparatus of this invention from which a plurality of envelopes may be formed.

Referring now to the drawings, in FIGURE 1 is shown an apparatus 14 constructed in accordance with this invention. Apparatus 14 comprises a material storage means 16, means 18 for forming longitudinally extending pleats within a flexible, sheetlike material, an adhesive applicator 20, means 22 for bringing one of the sheets into contacting engagement with the other of said sheets, printing means 24, means 26 for severing the sheetlike item being processed through the apparatus 14, and means 28 for continuously forming stacks of a flexible sheetlike item being processed through the apparatus 14. In FIGURES 7–9 is shown a means for increasing the longitudinal rigidity of each sheetlike item being processed through the apparatus 14, said means comprising a pair of endless belts 30 each disposed to traverse a respective one of a pair of pulleys 32, said pulleys being mounted to rotate about a common shaft 34, an endless belt 36 disposed to traverse about pulleys 38 mounted to rotate about a shaft 40, said shaft 40 being vertically spaced above shaft 34, and a pair of elongated means 42, each means 42 being disposed with a portion thereof to overlie a portion of a respective one of said belts 30.

Referring again to FIGURE 1, a material storage means 16 inuludes a pair of horizontally disposed, cylindrically shaped members 44 and 46 rotatably and removably mounted, respectively, from support means 48 and 50. Each cylindrical member 44 and 46 is adapted to receive a roll of flexible, sheetlike material such as paper, plastic, cellophane, glassine and the like. Where encompassing means having a circumferentially expandable periphery are to be formed, the roll of flexible, sheetlike material disposed on cylindrical member 44 is of greater width than the roll of flexible, sheetlike material to be disposed on cylindrical member 46.

The means 18 for forming longitudinally extending pleats within the roll of material (not shown) to be disposed on cylindrical member 44 comprises member 52, means 54 for feeding a flexible, sheetlike material along member 52, a surface means 56 and rollers 58. Although a pair of members 52 are shown in FIGURES 1–4, it will be understood that one or more of such members 52 may be used as desired. Referring now to FIGURES 2–5, each member 52 comprises a generally curved surface portion 60 which is interconnected with a generally flat surface portion 62. The longitudinal edges 64 of each member 52 are formed generally divergently in a direction from the interconnection of flat surface portion 62 with curved surface portion 60 toward the end 66 of said flat surface portion 62. Longitudinal edges 64 are disposed in spaced parallel relation with respect to portions of surface means 56. The means 54 for feeding a flexible, sheetlike material along members 52 comprises endless belts 68, pulleys 70, shafts 72, rollers 74 mounted for pivotal movement about shaft 76 and means (not shown) for imparting movement to said endless belt 68.

The adhesive applicator 20 comprises an adhesive container 78 and a plurality of rollers 80, 82 and 84. Adhesive roller 80 transfers adhesive from the container 78 to the roller 82. Adhesive roller 82, in turn, transfers adhesive from the surface of roller 80 to portions of roller 84. In FIGURE 6 is shown a perspective view of roller 84. As shown, roller 84 has a plurality of raised portions 86, 88, 90 and 92. Thus, the adhesive disposed on the surface of roller 82 is transferred only to the raised portions 86, 88, 90 and 92 of roller 84. In turn, adhesive deposited on the raised portions of roller 84 is transferred to predetermined portions on one of the surfaces of the sheetlike material supported upon cylindrical member 46. It will be noted that the width of the raised portion 90 is preferably about twice the width of raised portions 86 and 88. This feature is used where the sheet passing through apparatus 14 is to be subsequently severed in a general longitudinal direction and thus width of the bonded portions formed by raised portion 86 will be about equal to the width of the bonded portion formed by one-half of raised portion 90.

The means 22 for bringing the sheets into contacting engagement include rollers 94 and 96. In FIGURES 1 and 5, a plurality of rollers 96 are shown mounted upon shaft 98. The distance separating each end roller 96 from the central roller 96 is the same distance separating the end raised portions 86 and 88 of roller 84 from the central raised portion 90 of roller 84. Additionally, it will be noted that portions of the surface 56 are formed spaced from each other in the same manner and to the same extent as rollers 96 and raised portions 86, 88 and 90 of roller 84.

The printing means 24 is generally similar to that used in printing operations and comprises a pair of ink containers 98 and 100 and rollers 102, 104 and 106 for each ink container. Roller 102 transfers the ink from the container to the surface of the plates 108 which are mounted upon each roller 104. The ink deposited upon the surface of the plates 108 is then transferred to the surface of a flexible material which is being fed about roller 106. It will be readily apparent that a single ink container may be used in lieu of a pair of ink containers but that the use of a pair of containers permits printing in different colors.

The severing means 26 comprises means 110 for severing or cutting the item passing through apparatus 14 into longitudinal strips and means 112 for severing or cutting the longitudinal strips so formed into items of predetermined length. The means 110 comprises a plurality of blade elements 114 mounted on shaft 116. The severing portion of the blade elements 114 is disposed to intercept a path of travel of the item being processed through the apparatus 14. The means 112 comprises a severing element 118 which in turn is supported upon a shaft 120.

Downstream of severing means 26 is positioned an item transport means comprising the endless belts 30 and 36, see FIGURES 7–9. The items formed as a result of the severing operation pass between the belts 30 and 36 and are ejected outwardly therefrom into the stack forming means 28. It will be noted that belt 30 rotates in a direction opposite that to which belt 36 rotates. Prior to the ejection of the items from between said belts 30 and 36, the longitudinal edges of same pass over the wires or elongated means 42 thereby causing said edges to curve upwardly relative to the longitudinal axis of said item. The configuration so formed increases the longitudinal rigidity of each item thereby greatly facilitating the handling thereof between the transport means formed by said belts 30 and 36 and the stack forming means 28. Such handling is further facilitated by the use of jets 122 connected to a source (not shown) of compressed gas through a conduit 124. Intermittent pulses of pressurized gas are ejected from the ends of jets 122 just as the trailing portion of an item which has passed between the belts 30 and 36 of the item transport means passes beneath jets 122. The effect of imparting a downward force on the trailing edge of each item after said item has passed between the belts 30 and 36 results in the trailing edge of each item moving quickly downwardly and out of the way of the leading edge of the following item.

The stack forming means 28 comprises a first support means 126, a second support means 128, a vertically disposed surface means 130 mounted above said first support means 126, item guide means 132, and means 134 for horizontally translating or "jogging" said vertically disposed surface means 130. In FIGURE 1, 7 and 8, the first support means 126 comprises an endless belt 136 mounted upon a pair of rollers 138. Rollers 138 are mounted within support means 140. The vertically disposed surface means 130 comprises opposed, spaced apart wall members 142 depending from a support platform 146. Platform 146 has a pair of elongated portions 148 extending outwardly from the opposite ends thereof. Each of said portions 148 are disposed within rectangular openings 150 which are formed in end members 152. Means 134 for horizontally translating the vertically disposed surface means 130 is mounted on top of support platform 146. Means 134 comprises a motor 154, a link member 156 having one end thereof connected to the drive shaft of motor 154, and a rod member 158. One end of the rod member 158 is mounted within a slot 160 of member 162 and maintained therein by any suitable means such as a nut and washer combination or an enlarged diameter portion. Member 162 is secured to the end member 152 in any suitable manner such as by welding or the use of bolts or screws (not shown). The other end of the rod member 158 is connected to the link member 156. Thus, upon actuating motor 154 a horizontal translatory motion is imparted to support platform 146 and to depending members 142 and 144. Such motion effectively maintains the edges of each of the items in the stack in a generally disposed vertical plane. In addition, support platform 146 is connected to one end of piston rods 164. Each piston rod 164 is also connected to a piston (not shown) disposed within the fluid actuating cylinder 166. Cylinders 166 are connected to a source (not shown) of a pressurized fluid through conduits 168 and 170. Thus, when a pressurized fluid is admitted into cylinders 166 through conduits 170 the piston and piston rod 164 will move upwardly thereby vertically elevating the support platform 146 and depending members 142 and 144. However, upon admitting pressurized fluid into cylinders 166 through conduits 168 and venting the lower portions of cylinders 166 through conduits 170, the support platform 146 and depending members 142 and 144 will be caused to move downwardly and assume the position shown in FIGURE 8. Thus, the supporting platform 154 and depending members 142 and 144 are mounted for horizontally translatable motion as well as vertically reciprocal motion. Further, the horizontally translatable motion may be continuously applied while the vertically reciprocal movement may and preferably is, intermittently applied.

The second support member 12 is normally disposed beneath the endless belts 30 and 36 of the item transport means with the forward end thereof lying in the vicinity beneath shafts 34 and 40. As previously stated, the second support means 128 is mounted for horizontal reciprocal movement. Thus, upon actuation thereof, the second support means 128 is moved from beneath the endless belts 30 and 36 in a horizontal direction to a position overlying portions of the first support means 126. More specifically, upon actuation the second support means 128, each of which preferably comprises a bifurcated member, moves in a downstream direction until it is positioned between opposed members 142. It will be readily apparent that upon actuation of second support means 128, the upper surface thereof will receive items or articles ejected from article transport means comprising belts 30 and 36.

The purpose of the wire guide means 132 is to direct each item being ejected from the time transport means into the area circumscribed by the depending members 142 and 144.

The first support means 126 preferably comprises endless belt 136 having a plurality of switch actuating members 172 mounted on the outer surface thereof. A motor 174 drives the endless belt 136 through a gear reduction means 176. Upon actuation of the motor 174, the endless belt 136 is rotated in a clockwise direction as viewed in FIGURE 8. Upon movement of endless belt 136, one of the switch actuating members contacts a switch (not shown) and actuates same. Actuation of the switch (not shown) shuts off motor 174.

The operation of the apparatus is now described. Two rolls of flexible, sheetlike material are positioned within material storage means 16. Where a gussetted container or encompassing means is to be produced, the width of one of the rolls i.e., the roll mounted on cylindrical member 44, has a greater width than the roll mounted on cylindrical member 46. The free end of the roll mounted on cylindrical member 44 is threaded or fed over roller 178, down between the endless belts 68 and the surface means 56 with intermediate portions thereof overlying the surface of member 52 (see FIGURE 5), and down between roller 94 and endless belt 68 thereby coming into contacting engagement with the material contained within the roll mounted upon cylindrical member 46. The material contained within the roll mounted upon cylindrical member 46 is fed downwardly to pass along a path shown in dotted line 232 beneath roller 180 and thence upwardly between rollers 90 and 94, and thence around roller 94 whereby same comes into contacting engagement with the material being fed from the roll mounted on cylindrical member 44. As the material passes upwardly between rollers 90 and 94, adhesive is deposited on one surface thereof along predetermined portions. Upon bringing the two sheetlike materials into contacting engagement as same pass between rollers 94 and 96, said sheetlike materials are bonded or become adhered to each other.

As previously stated, as the material being fed from the roller mounted on cylindrical member 44 passes between the endless belts 68 and the surface 56, intermediate portions of said material pass over upper surface of member 52. Now referring to FIGURE 3, is is to be noted that the width of the material being fed from the roll mounted on cylindrical member 44 is sufficient to permit the material to extend from the left side of the left endless belt 68 to the right side of the right endless belt 68 with the intermediate portions thereof overlying the curved surfaces 60 of members 52. As the material passes in a downstream direction along members 52, it will also be noted that the longitudinal edges thereof are continuously maintained between the surface 56 and the left and right endless belts 68. Consequently, as a result of passing or feeding the material in this fashion combined with the use of member 52 having the flat surface portion 62 with diverging longitudinal edges 64, where two members 52 are used a pair of pleats 182 and an inverted pleat 184 is formed as shown in the upper portion of FIGURE 12. The inverted pleat 184 is formed immediate the longitudinal edges of such material. It is to be noted that the periphery of the curved surface portion 60 of member 62 is less than the length of the end 66 of member 52.

As the adhered or bonded together sheets of material pass between rollers 94 and 96, such bonded materials are passed downwardly along dotted line 234 about roller 186 (see FIGURE 5), thence in a generally horizontal direction toward roller 188 (see FIGURE 1) where same is passed upwardly between roller 106 and the upstream roller 104, thence about roller 106, thence downwardly between roller 106 and downstream roller 104, thence down and about roller 190 thence in a generally horizontal direction toward roller 192, thence upwardly over rollers 194, 196, and 198 (see FIGURE 11), thence downwardly past blade elements 114 thereby separating said adhered together materials into longitudinal strips, thence down about roller 200, thence upwardly and passing between rollers 202 and 204 and thence between the transverse cutter 118 of means 112 and surface 206 thereby separating the longitudinal strips into items or articles of predetermined length. It is to be noted that the peripheral speed of the means 112 is slightly greater than the peripheral speed of any of the upstream rollers used to transport or feed the adhered together materials to the transverse cutter 118. The purpose of this is to insure a clean separation between the adhered together materials passing between roller 200 and 204 and the transverse cutter 118 thereby minimizing or eliminating altogether the possibility of the trailing edge of the article or items from becoming mixed up with the leading edge of the following items or articles. The articles or items passing between the transverse cutter 118 and surface 206 are then fed between the endless belts 30 and 36. As previously indicated, upon being ejected from between said belt 30 and 36, the longitudinal edges of each article is curved upwardly as a result of passing over the wire or elongated means 42 which is disposed above each belt 30 and pulley 32. The curving of each item or article in this manner results in an increase in the longitudinal rigidity of such item or article thereby greatly facilitating the subsequent handling thereof. As the trailing edge of each item or article clears the belt 30 and 36, an impulse of pressurized gas is emitted from the jets 122 and directed upon the trailing edge of each item or article. The imparting of a force on the trailing edge of each item or article in this manner insures that the trailing edge of such item or article will not interfere with or become intermixed with the leading edge of the following item or article. The forward or leading edge of each item or article contacts the wire guide mans 132 which assists in directing each item or article downwardly between depending members 142 and 144 and onto the first support means 126. It should be noted that the intermittent impulses of pressurized gas ejected from the jets 122 are suitably synchronized with the speed of the articles passing between the belts 30 and 36 such that the pressurized gas impulse is directed only against the trailing edge of each article or item.

Suitable means (not shown) are used to indicate the number of articles or items contained within each stack positioned upon the first support means 126. When a predetermined quantity of articles are contained within each stack, the second support means 128 is actuated by suitable means (not shown) thereby resulting in same being positioned above the stacks for the purpose of receiving articles or items being ejected from between the belts 30 and 36. At the same time, pressurized fluid is admitted into the cylinders 166 through conduits 170 thereby resulting in the support platform 146 and the depending members 142 and 144 being elevated. Upon support platform 146 and depending members 142 and 144 reaching a predetermined elevation, the motor 174 is actuated thereby causing the stacks positioned on belts 136 to be moved toward the right as viewed in FIGURE 8. In the meantime, new stacks are being continuously formed within the stack forming means 28, said stacks being supported upon second support means 128. When one of the switch actuating members 172 contacts a switch (not shown), the stacks positioned upon endless belt 136 have reached a desired position, one of the switch actuating members 172 actuates a switch (not shown) and motor 174 is thus shut off. At the same time, pressurized fluid is admitted into cylinders 166 through conduits 168 and the fluid in the lower portions of cylinders 166 is vented through conduits 170. Thus, the support platform 146 and the depending members 142 and 144 are vertically lowered to their former position. Also, the second support means 128 is retracted in an abrupt rapid manner to its former position with the results that the stack or stacks disposed thereon drops onto the first support means 126. The stacks positioned on the right end portion of the endless belt 136 are then removed therefrom. Consequently, it will be readily appreciated that the apparatus as described permits the continuous stacking of a predetermined quantity of generally flatlike articles without interfering with the operation of the apparatus 14.

Although the foregoing description relating to the operation of apparatuses 14 has been given in connection with the production of circumferentially expandable encompassing means or containers adapted for stacking in a flat condition, it is to be understood that encompassing means for containers such as envelopes, presealed bands, bags and the like may be produced by an apparatus as described without the use of means 18 for producing circumferentially expandable items. Further, it is to be understood that the first support means 126 need not include an endless belt as shown since the stacks formed thereon may be manually removed following the formation thereof. Further, it is also to be understood that an apparatus constructed in accordance with this invention may include as many members 52 as is desired or required. In such event, suitable and appropriate changes will be made in rollers 90 and 94, rollers 104, the number of blade elements 114 mounted on shaft 116 and the number and positioning of severing elements 118 on shaft 120, the number of belts 30 and 36, and the number of depending members 142 and 144. Additionally, it will be appreciated that the number of items to be contained within each stack can be adjusted as desired or required. It will be further appreciated that a heater (not shown) may also be used to decrease the amount of time required for the ink to dry.

Now referring to FIGURES 13-18, in FIGURE 13 is shown a flat bag or container 208, with the upper portion partially cut away, which can be produced and rapidly processed through the subject apparatus. Since the bag or container does not have an expandable circumference, the apparatus require to produce this particular bag or container need not include means 18. As shown in FIGURE 13, the bag or container 208 is adhered together along three of the four sides, the fourth side 210 being open and thereby providing ready access to the interior of the bag or container 208. In FIGURE 14 is shown a schematic cross-sectional view of the bag or container 208. As previously indicated, adhesive or glue 212 is disposed between the two sheets of material along the longitudinal edges thereof thereby bonding said sheets of material together.

In FIGURE 15 is shown a bag or container 214 having an expandable circumference. As in the case with bag or container 208, bag or container 214 is likewise sealed along three of the four edges, the fourth edge 216 being open thereby providing access to the interior of the bag or container 214. In FIGURE 16 is shown a schematic cross-sectional view of gussetted container 214. As previously indicated, adhesive or glue 212 bonds the longitudinal edges of the sheet-like material together.

In FIGURE 17 is shown an encompassing means 218. Encompassing means 218 is formed similar to container 208 except that it is sealed along opposed sides 220 only, sides 222 being left open. Engaging means 218 may subsequently be cut or severed along broken lines 224 to form a plurality of engaging means or presealed bands. Such bands may be used suitably to encompass an item such as a folded shirt or the like to retain such item in its folded condition.

In FIGURE 18 is shown an item 226 comprising a plurality of envelopes produced by an apparatus constructed in accordance with this invention. It will be understood that item 226 will be produced by an apparatus which does not utilize means 18. It will be also be understood that the rolls of material being used to produce items 226 will be of dissimilar widths. Each item 226 will subsequently be severed along lines x—x and y—y to produce a plurality of envelopes. Each envelope has a flat portion 230 which may be suitably sealed to the upper surface of the envelope when overfolded thereagainst.

It has been found that for certain adhesives or glues, such as are normally used to bond a plastic material to other materials, roller 80 of means 20 must be rotated continuously even though the apparatus 14 as a whole is not operating, i.e., the sheet materials are not being fed or processed through the apparatus. As shown in FIGURE 2, a motor 236 operating through an over-ride clutch 238 is used to drive roller 80 when the rest of the apparatus is shut down. In addition, a pair of hydraulic cylinders 240, one of which is shown in FIGURE 1, is used to move roller 80 and the box 242 within which said roller 80 is journalled for rotation to a position such that roller 80 no longer contacts roller 82. Motor 236 normally operates when the rest of the apparatus is being operated but at a slightly slower speed than the rest of the apparatus. Consequently, upon shutting down of the rest of the apparatus, roller 80 continues to operate, thereby keeping the adhesive in an agitated state, although the speed of rotation is slightly less than when the entire apparatus is operating. Without such an arrangement, the adhesive would set up and harden within a matter of seconds following a shut down of the apparatus and thus necessitate an expensive and time consuming cleaning up of the roller 80 and container 78.

It has been found that an apparatus constructed in accordance with the subject invention which incorporates only three members 52 may be used to produce approximately 20,000 containers per hour of the type shown in FIGURE 15. This production rate is approximately twice that heretofore obtained with conventional type gusset-container forming apparatuses. It will be also understood that the above production rate can be further increased through the incorporation of additional members 52. In addition to the high rate of production, it is possible to produce an extremely attractive container or bag formed from dissimilar but contrasting materials. Further, it will be understood that a bag or container constructed in accordance with the subject invention will be inherently stronger than a bag or container having only one sealed edge rather than two sealed edges. It will also be understood that the adhesive applicator shown in FIGURE 5 may be replaced by a heat sealing means where both of the materials used to form bag or container are susceptible of being bonded together by heat sealing treatment.

From the foregoing description, it will be readily apparent that a greatly improved apparatus for rapidly producing, processing and continuously stacking sheet-like items has been disclosed. The use of the novel means for forming longitudinal pleats and inverted pleats in a sheet of flexible material enables the rapid production of gussetted containers and encompassing means from a pair of sheet-like materials thereby reducing the overall cost of such an apparatus and decreasing the production cost of forming such containers and means. The use of means for increasing longitudinal rigidity of a flexible sheetlike item permits an increased rate of processing thereof in an appartus as contemplated herein. The handling characteristics of such flexible, sheetlike items are further enhanced as a result of applying a downward force on the trailing edge of each item as same is ejected from the item transport means into the stack forming means. The use of a horizontally translatable and vertically reciprocal jogger in combination with a pair of stack support means, one of said stack support means being adapted intermittently to overlie a portion of the first stack support means 126, permits the rapid formation of stacks of items containing a precise number of items therein.

It is to be understood that this invention is not limited to the exact embodiments of the apparatus shown and described, which is merely by way of illustration and not apparent to those skilled in the art, and it is therefore intended that the appended claims cover all such changes and modifications.

What we claim is:

1. An apparatus for producing from a pair of sheets formed from flexible materials circumferentially expandable encompassing means and rapidly processing and stacking same, said apparatus comprising means for simultaneously supplying a pair of sheets of dissimilar widths, means for forming pleats adjacent opposite edges of the wider of said sheets, means for adhering together said sheets along said edges, means for continuously forming a vertically disposed stack containing a predetermined quantity of encompassing means, means for increasing the longitudinal rigidity of each encompassing means by curving opposite edges thereof prior to the delivery thereof to said stack forming means, and means for imparting a downward force on the rearward portion of each encompassing means immediately prior to the delivery thereof to said stack forming means, said stack forming means comprising a first and second stack support means, said second stack support means being mounted for reciprocal movement in a plane disposed a predetermined distance above said first support means, said second support means being adapted to receive encompassing means upon being disposed above said first support means.

2. An apparatus as described in claim 1 in which said stack forming means includes vertically disposed surface means positioned above said first support means, said surface means being mounted for translatory movement in a direction transverse to the direction of feed of said encompassing means onto said support means and for vertical reciprocal movement.

3. An apparatus for producing circumferentially expandable encompassing items from a pair of sheets formed from flexible material and rapidly processing and stacking same, said apparatus comprising means for simultaneously supplying a pair of flexible, elongated sheets of dissimilar widths; means for forming longitudinally extending pleats adjacent opposite edges of the wider of said sheets, said pleat forming means comprising a pair of opposed members one of which has divergently formed sides and means for simultaneously passing in the direction of divergence the wider of said sheets over the member having divergently formed sides while simultaneously passing longitudinally extending edge portions of the wider of said sheets between said opposed members in the direction of divergence until folded, longitudinally extending portions of predetermined width are disposed between said opposed members adjacent the edges of said divergently formed sides; means for adhering together said sheets along the folded portions thereof; a first and second stack support means; means for continuously feeding in a sequential manner a predetermined quantity of encompassing means onto one of said support means; said second support means being mounted for reciprocal movement in a plane disposed in a predetermined distance above said first support means, said second support means being adapted to receive items from said feeding means upon being disposed above said first support means; a vertically disposed surface means positioned above said first support means, said surface means being mounted for translatory movement in a direction transverse to the direction of feed of said feed means and for vertical reciprocal movement; means for increasing the longitudinal rigidity of each encompassing item by curving opposite edges thereof prior to the delivery thereof to said stack forming means; means for imparting a downward force on the rearward portion of each encompassing item immediately following the exiting thereof from said transport means; and means for elevating said surface means and effecting movement of said second support means.

4. An apparatus for producing circumferentially expandable encompassing means from a pair of sheets formed from flexible material and rapidly processing and stacking same, said apparatus comprising means for simultaneously supplying a pair of flexible sheets of dissimilar widths; means for forming pleats adjacent opposite edges of the wider of said sheets and at least one longitudinally extending inverted pleat disposed intermediate said longitudinally extending pleats; means for adhering together said sheets along the peated portion thereof; means for longitudinally severing said sheets along said inverted pleat portions and transversely thereof to form encompassing means of predetermined length; means for continuously forming vertically disposed stacks containing predetermined quantities of encompassing means; means for increasing the longitudinal rigidity of each encompassing means by curving opposite edges thereof prior to the delivery thereof to said stack forming means; means for imparting a downward force on the rearward portion of each encompassing means immediately prior to the delivery thereof to the said stack forming means; said stack forming means comprising a first and second stack support means, said second stack support means being mounted for reciprocal movement in a plane disposed a predetermined distance above said first support means, said second support means being adapted to receive encompassing means upon being disposed above said first support means; vertically disposed surface means positioned above said first support means, said surface means being mounted for translatory movement in a direction transverse to the direction of feed of said encompassing means onto said support means and for vertical reciprocal movement; and means for elevating said surface means.

5. An apparatus for rapidly processing and stacking flexible sheetlike items, said apparatus comprising means for continuously forming a vertically disposed stack containing a predetermined quantity of items, means for transporting flexible sheetlike items to said stack forming means, means for increasing the longitudinal rigidity of each sheetlike item by curving opposite edges thereof prior to the delivery thereof to said stack forming means, and means for imparting a downward force on the rearward portion of each sheetlike item immediately following the existing thereof from said transport means.

6. An apparatus for rapidly processing and stacking flexible sheetlike items, said apparatus comprising a stacking means, means for transporting flexible sheetlike items to said stacking means, means for forming each sheetlike item into a generally concave configuration prior to the ejection thereof from said transport means, and means for imparting a downward force on the rearward portion of each sheetlike item immediately following the exiting thereof from said transport means.

7. An apparatus for rapidly processing and continuously forming stacks of flexible sheetlike items containing predetermined quantities of items, said apparatus comprising a stacking means, means for transporting sheetlike items to said stacking means, means for forming each sheetlike item into a generally concave configuration prior to the ejection thereof from said transport means, means for imparting a downward force on the rearward portion of each sheetlike item immediately following the exiting thereof from said transport means, said stacking means including a first and second stack support means, said second stack support means being mounted for reciprocal movement in a plane disposed a predetermined distance above said first stack support means, said second stack support means being adapted to receive items from said transport means upon being disposed above said first stack support means.

8. An apparatus for producing from a pair of sheets formed from flexible materials gussetted encompassing means adapted for stacking in a flat condition, said apparatus comprising means for simultaneously supplying a pair of flexible elongated sheets of dissimilar widths, means for forming longitudinal extending pleats along opposite edges of the wider of said sheets, said pleat forming means comprising a pair of opposed members one of which has divergently formed sides and means for simultaneously passing in the direction of divergence the wider of said sheets over the member having divergently formed sides while simultaneously passing longitudinally extending edge portions of the wider of said sheets between said opposed members in the direction of divergence until folded, longitudinally extending portions of predetermined width are substantially disposed between said opposed members adjacent the edges of said divergently formed sides, means for adhering together said sheets along said folded portions, and means for severing the adhered sheets to form gussetted encompassing means of predetermined length.

9. An apparatus as described in claim 8 in which said pleat forming means comprises a longitudinally extending member, generally planar surface portions disposed in spaced parallel relation to at least a portion of the opposed edges of said longitudinally extending member and means for passing elongated, flexible members between said opposed portions of said generally planar surface portions and the opposite edges of said longitudinally extending member, said longitudinally extending member having a generally curved surface portion interconnected to a generally flat surface portion, the opposite edges of a part of said flat surface portion being generally divergently formed.

10. An apparatus for forming from a pair of sheets formed from flexible materials circumferentially expandable encompassing means adapted for stacking in a flat condition, said apparatus comprising means for simultaneously supplying a pair of flexible sheets of dissimilar widths, means for forming longitudinally extending pleats along opposite edges of the wider of said sheets and at least one longitudinally extending inverted pleat disposed intermediate said longitudinally extending pleats, and means for adhering together said sheets along the pleated portions thereof.

11. An apparatus as described in claim 10 in which said pleat forming means comprises a plurality of longitudinally extending members, generally planar surface portions disposed in spaced parallel relation to at least portions of the opposed edges of said longitudinally extending members and means for passing endless flexible members between said opposed portions of generally planar surface portions and the opposite edges of said longitudinally extending members, each longitudinally extending member having a generally flat surface portion, the opposite edges of a portion of each of said longitudinally extending members being generally divergently disposed.

12. An apparatus for continuously forming a plurality of vertically disposed stacks each containing a predetermined quantity of items, said apparatus comprising a first and second support means; means for continuously feeding onto one of said support means a plurality of items to form a plurality of stacks; vertically disposed surface means positioned above said first support means, said surface means being mounted for translatory movement in a direction transverse to the direction of feed of said feed means and for vertical reciprocal movement; said second support means being adapted for reciprocal positioning a predetermined distance above said first support means to receive items being fed from said feed means, and means for elevating said surface means and effecting movement of said second supporting means.

13. An apparatus for forming from a pair of sheets formed from flexible materials circumferentially expandable encompassing means adapted for stacking in a flat condition, said apparatus comprising means for simultaneously supplying a pair of flexible sheets of dissimilar widths, means for forming longitudinally extending pleats along opposite edges of the wider of said sheets and at least one longitudinally extending inverted pleat disposed intermediate said longitudinally extending pleats, and means for adhering together said sheets along the pleated portions formed along the opposite edges of the wider of said sheets.

References Cited

UNITED STATES PATENTS

| | | | |
|---|---|---|---|
| 2,032,709 | 3/1936 | Midboe | 93—20 XR |
| 2,511,031 | 6/1950 | Yount | 93—20 XR |
| 2,701,989 | 2/1955 | Hayward et al. | 93—20 |
| 2,819,661 | 1/1958 | Howdle et al. | 93—93.3 |
| 3,025,770 | 3/1962 | Aronson et al. | 93—61 XR |

BERNARD STICKNEY, *Primary Examiner.*